United States Patent [19]

Hawley et al.

[11] Patent Number: 5,024,450
[45] Date of Patent: Jun. 18, 1991

[54] SEAL CARTRIDGE ASSEMBLY

[75] Inventors: Erwin T. Hawley; Gregory S. Kladden, both of Indianapolis, Ind.

[73] Assignee: Rexnord Corporation, Milwaukee, Wis.

[21] Appl. No.: 446,204

[22] Filed: Dec. 5, 1989

[51] Int. Cl.⁵ .............................................. F16J 15/34
[52] U.S. Cl. ........................................ 277/37; 277/39; 277/95
[58] Field of Search .................... 277/37, 38, 39, 68, 277/81 R, 83, 95, 96.1, 174, 206 A, 35, 84, 237 R, 237 A, DIG. 4; 384/139, 140, 481, 482, 485, 486

[56] References Cited

U.S. PATENT DOCUMENTS

| 2,561,694 | 7/1951 | Gilbert, Sr. | 277/39 X |
| 2,692,786 | 10/1954 | Reynolds | 277/35 |
| 2,888,281 | 5/1959 | Ratti | 277/81 R X |
| 2,960,355 | 11/1960 | Bayerl . | |
| 3,154,310 | 10/1964 | Hamano | 277/39 |
| 3,362,719 | 1/1968 | McCormick | 277/37 |
| 3,368,819 | 2/1968 | Otto | 277/37 |
| 3,504,917 | 4/1970 | Malmstrom | 277/95 X |
| 3,682,488 | 8/1972 | Matsushima | 277/37 |
| 4,049,281 | 9/1977 | Bainard | 277/38 X |
| 4,094,518 | 6/1978 | Cox | 277/95 |
| 4,188,039 | 2/1980 | Krisak et al. | 277/95 |
| 4,311,315 | 1/1982 | Kronenberg | 277/95 |
| 4,411,437 | 10/1983 | Conti . | |
| 4,426,091 | 1/1984 | Baylor | 277/95 X |
| 4,552,367 | 11/1985 | Fedorovich et al. | 277/37 X |
| 4,625,977 | 12/1986 | Azibert et al. . | |
| 4,792,242 | 12/1988 | Colanzi et al. | 384/482 |
| 4,875,786 | 10/1989 | DeWachter | 384/482 |

FOREIGN PATENT DOCUMENTS

| 1109969 | 6/1961 | Fed. Rep. of Germany | 277/95 |
| 1145882 | 10/1957 | France | 277/95 |
| 963677 | 7/1964 | United Kingdom | 277/37 |
| 1200648 | 7/1970 | United Kingdom | 384/486 |

Primary Examiner—Thomas B. Will
Assistant Examiner—Scott Cummings
Attorney, Agent, or Firm—Robert A. Brown

[57] ABSTRACT

A seal cartridge assembly is provided for providing a seal between a non-rotatable housing or casing member and a rotatable shaft and includes a housing comprised of overlapping annular case members. Each case member includes an outer peripheral wall portion and an annular flange portion extending radially inwardly from the outer peripheral wall portion. The two case members are press fitted together in overlapping relationship and held together by a bonded rubber belt to provide a U-shaped cartridge housing which is press fit and sealed to an inner bore of the non-rotatable housing. An annular sealing member is positioned within the cartridge housing and is adapted to be engageable with the shaft and rotate with the shaft within the U-shaped cartridge housing. The annular sealing member includes lip extensions extending outwardly therefrom which engage the annular flange sidewalls of the cartridge housing to provide a seal between the annular sealing member and the cartridge housing.

14 Claims, 2 Drawing Sheets

SEAL CARTRIDGE ASSEMBLY

FIELD OF THE INVENTION

The present invention relates to a seal cartridge assembly for sealing the space between a non-rotatable member and a rotatable member and, more specifically, to a seal cartridge assembly for sealing the space between a non-rotatable housing and a rotatable shaft positioned within the bore of the housing.

BACKGROUND OF THE INVENTION

Many and various rotatable seal assemblies have been suggested for sealing the space between a rotating shaft and a stationary housing. Many such seal assemblies involve positioning of sealing rings about a shaft to provide a seal assembly to prevent fluid flow between the shaft and the fixed housing. One example of such a complicated structure is depicted in U.S. Pat. No. 4,625,977 to H. Azibert et al. However, such seal assemblies are complex and very expensive to manufacture and result in significant down time to the machinery operation when such seal assemblies become clogged or inoperative. Additionally, when such seal assemblies are positioned between the rotating shaft and the fixed housing, problems of alignment oftentimes occur between the various sealing faces of the seal assembly.

Other types of rotatable seal assemblies permit the introduction of grease or lubricant within the sealing structure to flush the sealing structure and prevent contaminants from entering the seal between the rotating shaft and fixed housing. Again such seal structures are complicated and oftentimes include sealing washers and rollers which are extremely expensive and do not provide alignability between the rotating member and the fixed housing. One example of such a prior art structures is shown in U.S. Pat. No. 4,411,437 to R. Conti.

Still other types of rotatable seal assemblies are mounted within the fixed housing and include an annular sealing member which engages and seals against the rotating shaft. However, such sealing structures permit the introduction of contaminants to penetrate between the sealing face and the rotating shaft thereby resulting in increased wear to the shaft and the attendant loss of the seal between the rotating shaft and the fixed housing. An example of such a sealing assembly is shown in U.S. Pat. No. 2,960,355 to J. Bayerl.

SUMMARY OF THE INVENTION

It is an object of the present invention to provide a seal cartridge assembly for sealing the space between a non-rotatable housing member and a rotating shaft member which provides for an improved seal between the rotating shaft and the fixed housing.

It is another object of the present invention to provide an improved seal assembly which provides for axial alignment and improved sealing performance between the rotating shaft and the stationary housing.

It is still another object of the present invention to provide a novel seal cartridge assembly which is flushable and which permits lubricant flow in one direction through the seal assembly to remove contaminants from the seal assembly.

It is yet another object of the present invention to provide a seal cartridge assembly which substantially eliminates the wear occurring to the rotating shaft mounted within the bore of a stationary housing.

With the foregoing objects in mind, in accordance with one embodiment of the present invention, a seal cartridge assembly is provided for sealing the space between a non-rotatable housing member and a rotatable shaft. The seal cartridge assembly includes a housing comprised of overlapping annular case members, with each case member including an outer peripheral wall portion and each having an annular flange portion extending radially inwardly from the outer peripheral wall portion. The two case members are press fitted together in overlapping relationship and held together by a bonded rubber belt. The resultant seal cartridge housing is adapted to be press fit and sealed to an inner bore of the non-rotatable housing. An annular sealing member is positioned within the housing and is adapted to be engageable with the shaft and rotate with the shaft within the raceway or space defined by the seal housing flanges. The annular sealing member includes lip extensions extending outwardly therefrom which engage the annular flange sidewalls of the seal cartridge housing to provide a seal between the annular sealing member and the flange portions of the housing.

By utilizing the novel seal cartridge assembly construction, the resultant seal between the rotating shaft and the stationary or non-rotatable housing eliminates water splash or penetration through the seal cartridge assembly. The seal cartridge assembly in accordance with the present invention provides a sealing assembly which retains the lubricant or grease within the seal cartridge assembly and provides a seal cartridge assembly which is readily flushable in that grease will predeterminedly move through the seal cartridge assembly to lubricate and remove contaminants therefrom. Finally, the present seal cartridge assembly substantially eliminates wear between the rotating shaft and the fixed housing.

DESCRIPTION OF THE DRAWINGS

The foregoing description and other characteristics, objects, features and advantages of the present invention will become more apparent upon consideration of the following detailed description, having reference to the accompanying drawings, wherein.

DESCRIPTION OF THE PREFERRED EMBODIMENTS

Figure 1:
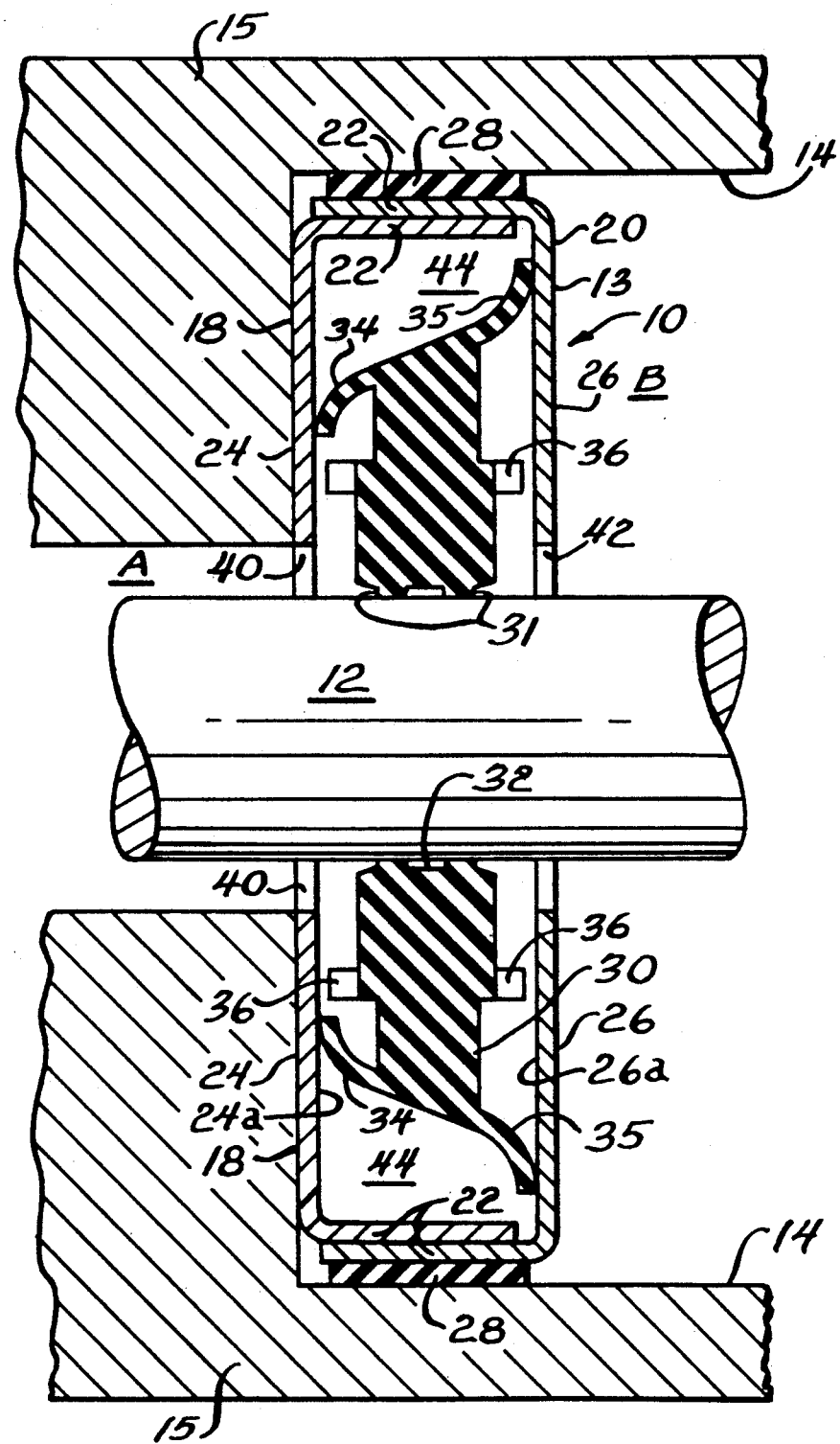
FIG. 1 is cross-sectional view of the seal cartridge assembly in accordance with one embodiment of the present invention.

Referring now to the drawings wherein like numerals have been used throughout the several views to designate the same or similar parts, the seal cartridge assembly, designated generally 10, has been assembled to a rotating shaft 12 which is mounted within the bore 14 of an outer stationary housing member 15. The seal cartridge assembly 10, as shown in FIG. 1, includes a housing 13 comprised of a pair of overlapping annular case members 18 and 20. Each of the case members 18 and 20 may be made of any suitable material such as, for example, steel, and are L-shaped in configuration. Each of the case members 18 and 20 include an outer peripheral wall portion 22 and each include an annular flange portion 24 and 26, respectively, extending radially inwardly from the outer peripheral wall portion. The annular flange portions 24 and 26 extend radially inwardly and define openings 40 and 42, respectively, which openings are larger than the diameter of the shaft 12 to permit the free rotation of the shaft within the housing 13 of the cartridge assembly and to permit the lubrication and flushing of the cartridge assembly, as will hereinafter be described. The inner surfaces 24a and 26a of the annular flange portions 24 and 26 provide a sealing facing which cooperates with the annular sealing ring 30, to provide the seal cartridge assembly in accordance with the present invention. As shown in FIG. 1, case member 20 is dimensionally larger than case member 18 which permits the two case members 18 and 20 to be press fitted together in an overlapping relationship and held together by a bonded rubber means or belt member 28.

The completed seal cartridge assembly 10 includes, positioned within the annular flange portions 24 and 26 of the case members 18 and 20, respectively, an annular sealing ring or member 30. The annular sealing member 30 includes a pair of inner annular projecting beads 31 extending inwardly from the inner diameter surface 32 of the annular sealing ring or member 30, which beads are sized and adapted to sealingly engage about the outer surface of the shaft 12 to firmly retain the annular sealing ring or member 30 on the shaft and to be rotated by the shaft.

Figure 2:
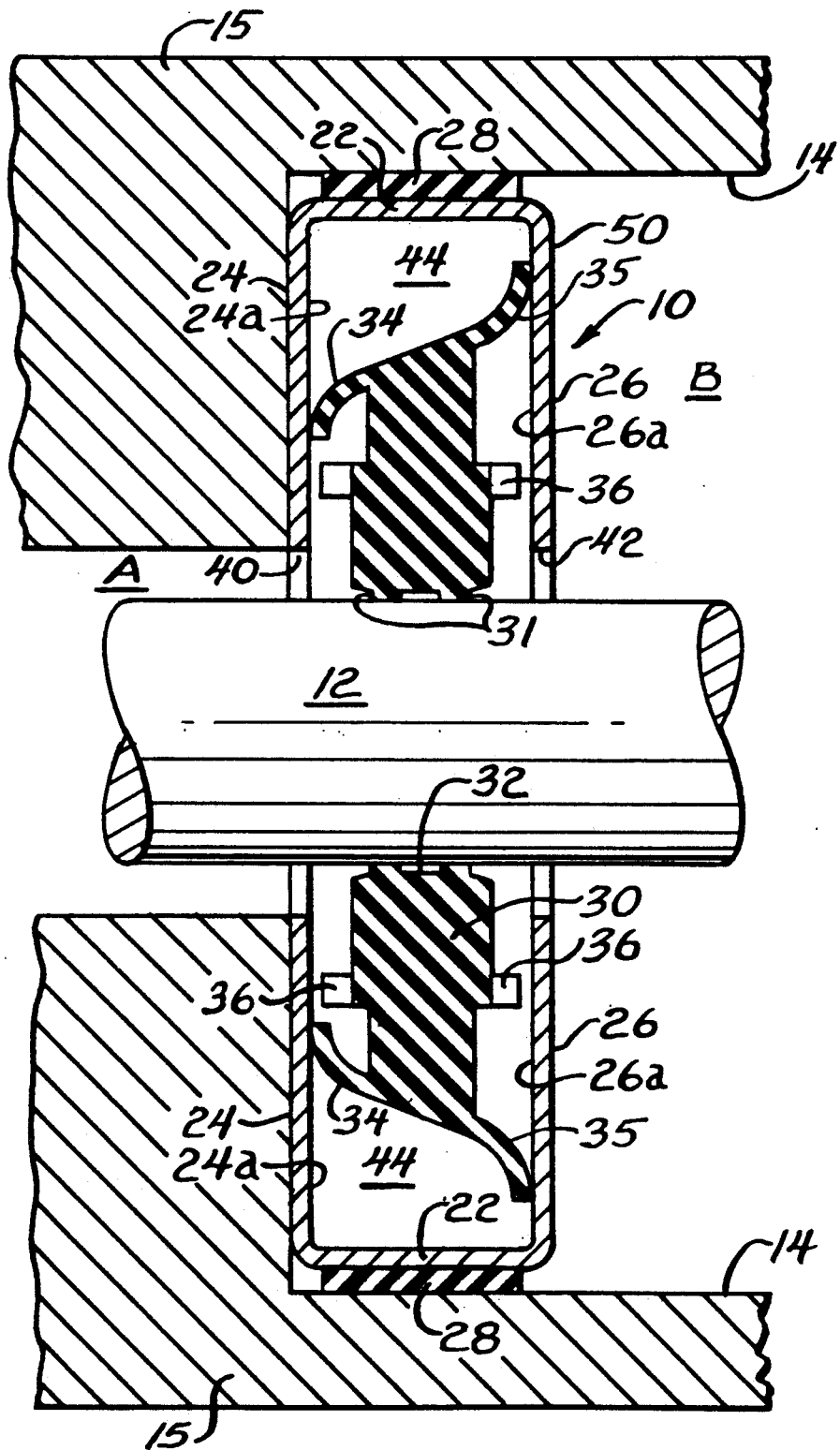
FIG. 2 is a cross-sectional view of a seal cartridge assembly in accordance with another embodiment of the present invention.

The annular sealing ring or member 30 is comprised of rubber or other elastomeric material, as is well known in the art, and includes a pair of resilient annular lip extensions 34 and 35. Lip extension 34 extends axially and inwardly from the body of member 30 and engages the inner surface 24a of the annular flange 24 of the housing assembly, with the other lip extension 35 extending axially and outwardly from the body of the annular sealing member 30 to engage the inner surface 26a of the annular flange 26 of the seal assembly, as shown in FIGS. 1 and 2. The lip extensions 34 and 36 provide a lip seal between the annular sealing member 30 and the inner surface of the annular flange portions as the shaft and sealing member 30 rotate to provide the seal between the rotating shaft 12 and the fixed housing 15.

The annular sealing ring 30, preferably, includes side annular bumper means or projections 36 extending axially and intermediate the sidewall of the annular sealing ring 30. Although the bumper means 36 is shown as a continuous annular bumper, it is within the scope of the present invention that the bumper means may be discontinuous and spaced equally about the sidewall of the ring 30. The annular bumper means 36 provide for the self-aligning of the annular sealing ring with respect to the seal cartridge housing by confining the rotating sealing ring within the annular flange portions 24 and 26.

In operation, the annular sealing ring 30 is positioned within the case members 18 and 20 and the case members are press fitted together in overlapping relationship and held together by the bonded rubber belt 28. The resultant seal cartridge assembly 10 is slidably positioned about the shaft 12 such that a press seal fit is achieved between the bonded rubber belt and the bore of the outer housing to retain the assembly housing firmly secured to the fixed housing 15, the position as shown in FIG. 1. At the same time, the annular sealing ring 30 is press fit onto shaft 12 upon the engagement of the annular projecting beads 31 about the shaft to seal the ring to the shaft. When a cap (not shown) seals the end of the housing and shaft assembly (not shown), lubricating grease or fluid is directed into the seal cartridge assembly interior by flowing from chamber B through opening 42 between the shaft 12 and the annular flange portion 26. The grease flows past the lip seal 36 and inner surface 26a into the chamber 44 and then past lip seal 34 and inner surface 24a and out the annular opening 40 between the flange 24 and the shaft 12 to fill the interior of the seal cartridge assembly with grease. The grease or lubricant permits the seal assembly to be flushed to remove contaminants which may penetrate into the seal assembly to provide increased wear life and to prevent the passage of any fluids from chamber A to chamber B which must pass through the seal cartridge assembly 10.

As shown in FIG. 2, a further embodiment of the present invention utilizes a one piece housing 50, preferably in a U-shaped configuration. The housing 50 is comprised of an outer peripheral wall portion 22 and two annular flange members 24 and 26 integral therewith and extending inwardly therefrom. Case member 50 includes an outer peripheral wall portion 22 and annular flange portions 24 and 26 extending radially inwardly from the outer peripheral wall portion. The annular flange portions 24 and 26 extend radially inwardly and define openings 40 and 42, respectively, which openings are larger than the diameter of the shaft 12 to permit the free rotations of the shaft within the housing of the cartridge assembly and to permit the lubrication and flushing of the cartridge assembly. The inner surfaces 24a and 26a of the annular flange portions 24 and 26 provide a sealing facings which cooperate with the annular sealing ring 30, to provide the seal cartridge assembly in accordance with this embodiment of the present invention as shown in FIG. 2.

The seal cartridge assembly 10 includes, positioned within the annular flange portions 24 and 26 of the case members 50, an annular sealing ring or member 30. The annular sealing member 30 includes a pair of annular projecting beads 31 extending inwardly from the inner diameter surface 32 of the annular sealing ring or member 30, which beads are sized and adapted to sealingly engage about the outer surface of the shaft 12 to firmly retain the annular sealing ring or member 30 on the shaft and to be rotated by the shaft.

The annular sealing ring or member 30 is comprised of rubber or other elastomeric materials, as is well known in the art, and includes a pair of resilient annular lip extensions 34 and 35. Lip extension 34 extends axially and inwardly from the body of member 30 and engages the inner surface 24a of the annular flange 24 of the housing assembly, with the other lip extension 35 extending axially and outwardly from the annular sealing ring 30 to engage the inner surface 26a of the annular flange 26 of the seal assembly, as shown in FIG. 2. The lip extensions 34 and 35 provide a lip seal between the annular sealing member 30 and the annular flange portions as the shaft and sealing ring 30 rotate to provide the seal between the rotating shaft 12 and the fixed housing 15.

The annular sealing ring 30 again includes side annular bumper means 36 extending axially and intermediate the sidewall of the annular sealing ring 30. The annular bumper means 36, preferably in continuous annular form, provide for the self-aligning of the annular sealing ring with respect to the seal cartridge housing by confining the rotating sealing ring within the annular flange portions 24 and 26.

In operation, the annular sealing ring 30 is positioned within the case member 50 and one of the respective flange portions 24 or 26 is bent perpendicularly and inwardly to provide the U-shaped housing enclosing the sealing ring 30. The U-shaped housing is enclosed within the bonded rubber belt or means 28. The resultant seal cartridge assembly 10 is slidably positioned about the shaft 12 such that a press seal fit is achieved between the bonded rubber belt 28 and the bore 14 of the outer housing 15 to retain the assembly housing firmly secured to the fixed housing 15, the position as shown in FIG. 2. At the same time, the annular sealing ring 30 is press fit onto shaft 12 by the engagement of the annular projections 31 about the shaft to seal the ring to the shaft. When a cap (not shown) seals the end of the housing and shaft assembly (not shown), lubricating grease or fluid is directed into the seal cartridge assembly interior by flowing from chamber B through opening 42 between the shaft 12 and the annular flange portion 26, as previously discussed above. The grease flows past the lip seal 35 and inner surface 26a into the chamber 44 and then past lip seal 34 and inner surface 24a and out the annular opening 40 between the flange 24 and the shaft 12 thereby filling the interior of the seal cartridge assembly with grease or lubricant. The grease or lubricant permits the seal assembly to be flushed to remove contaminants which may penetrate into the seal assembly to provide increased wear life and to prevent the passage of any fluids from chamber A, the high pressure chamber, to chamber B, the low pressure chamber, which must pass through the seal cartridge assembly 10.

The present novel seal cartridge assembly provides an improved seal between a rotating shaft and the stationary non-rotatable housing thereby eliminating water splash or penetration from chamber A through the seal cartridge assembly 10 to chamber B. Moreover, the present seal cartridge assembly provides an improved assembly which retains the lubricant or grease within the seal cartridge housing, defined by the case member and flanges, which provides a seal assembly which is readily flushable to lubricate and to remove contaminants which may somehow penetrate into the cartridge assembly.

Additionally, the present seal cartridge assembly in accordance with the present invention substantially eliminates the wear between the rotating shaft and the fixed housing because the annular sealing ring 30 is securely sealed to the rotating shaft.

While the present invention has been described with reference to the above preferred embodiments, it will be understood by those skilled in the art, that various changes may be made and equivalents may be substituted for elements thereof without departing from the scope of the present invention. For example, the present seal cartridge assembly has particular application for providing a seal between a fixed member and a rotated member, one member which must extend into the other. Accordingly, it is within the scope of the present invention that the housing 15 may rotate about a stationary and non-rotating shaft 12, although the preferred embodiment contemplates a rotating shaft within the bore 14 of a non-rotating housing. Additionally, modifications may be made to adapt a particular situation or material to the teachings of the present invention without departing from the scope of the present disclosed invention. Thus, it is intended that the invention not be limited to the particular embodiments disclosed for carrying out this invention, but that the present invention includes all embodiments falling with the scope of the appended claims.

We claim:

1. A seal cartridge assembly for providing a seal between a non-rotatable member having an axial bore and a rotatable shaft mounted within the axial bore, including in combination:

a housing comprised of a pair of annular case members, each case member including an outer peripheral wall portion and having an annular flange portion extending radially inwardly from said outer peripheral wall portion, with the outer peripheral wall portion of each case member press fit together in overlapping relationship to provide a substantially U-shaped housing, with said annular flange portions defining aligned annular seal facings, single member annular seal means extending around and contacting only the outer peripheral wall portion of said case members, with said housing and said annular seal means being adapted to be press fit and sealed to the axial bore of the non-rotatable member, and an annular sealing ring positioned within said housing and adapted to be positioned about said rotatable shaft and rotatable therewith, a first flexible lip formed on said annular sealing ring extending obliquely and radially inwardly from the body of said sealing ring to resiliently engage an annular seal facing of said housing to provide a seal therebetween, a second flexible lip formed on said annular sealing ring extending obliquely and radially outwardly from the body of said sealing ring to resiliently engage the other of said annular seal facings of said housing to provide a seal therebetween, whereby said first and said second lip extensions of said sealing ring are effective at times to prevent fluid flow through the seal cartridge assembly.

2. The seal cartridge assembly of claim 1 wherein said annular seal means is an elastomeric belt.

3. The seal cartridge assembly of claim 2 wherein said elastomeric belt is comprised of rubber.

4. The seal cartridge assembly of claim 1 wherein said annular seal means includes at least one inner annular projecting bead extending radially inwardly from the inner annular diametral surface of the sealing ring, with said at least one annular projecting bead sealing said annular sealing ring to the rotating shaft.

5. The seal cartridge assembly of claim 1 wherein said first and said second lip extensions are deflectable from engaging their respective annular seal facing, thereby to permit flushing and removal of contaminants from the seal cartridge assembly.

6. The seal cartridge assembly of claim 1 wherein said annular sealing ring includes bumper means extending axially therefrom, said bumper means being selectively engageable with said annular seal facings of said housing to maintain alignment of said annular sealing ring with respect to said housing.

7. The seal cartridge assembly of claim 6 wherein said bumper means is an annular bumper extending axially from each sidewall of the sealing ring.

8. A seal cartridge assembly for providing a seal between a member having an axial bore and a shaft mounted within said axial bore, with either the member or the shaft being rotatable with respect to each other, including in combination:

a housing including an outer peripheral wall portion having annular flange portions extending radially inwardly from said outer peripheral wall portion to define a substantially U-shaped housing, with said annular flange portions providing aligned annular seal facings, single member annular seal means extending around and contacting only the outer peripheral wall portion of said housing, with said housing being adapted to be press fit and sealed to the axial bore of the member, and an annular sealing ring positioned within said housing and adapted to be positioned about the shaft and sealed thereto a first flexible lip formed on said annular sealing ring extending obliquely and radially inwardly from the body of said sealing ring to resiliently engage an annular seal facing of said housing to provide a seal therebetween, a second flexible lip formed on said annular sealing ring extending obliquely and radially outwardly from the body of said sealing ring to resiliently engage the other of said annular seal facings of said housing to provide a seal therebetween, whereby said first and said second lip extensions of said sealing ring are effective at times to prevent fluid flow through the seal cartridge assembly.

9. The seal cartridge assembly of claim 8 wherein said annular seal means is an elastomeric belt.

10. The seal cartridge assembly of claim 9 wherein said elastomeric belt is comprised of rubber.

11. The seal cartridge assembly of claim 8 wherein said annular sealing ring includes at least one inner annular projecting bead extending radially inwardly from the inner annular diametral surface of the sealing ring, with said at least one annular projecting bead sealing said annular sealing ring to the shaft.

12. The seal cartridge assembly of claim 8 wherein said U-shaped housing is comprised of a pair of annular case members, each case member having an outer peripheral wall portion and having an annular flange portion extending radially inwardly from said outer peripheral wall portion, with the outer peripheral wall portion of each case member press fit together in overlapping relationship to provide the U-shaped housing.

13. The seal cartridge assembly of claim 8 wherein said annular sealing ring includes bumper means extending axially therefrom, which bumper means are selectively engageable with said annular seal facings of said housing to maintain alignment of said annular sealing ring with respect to said housing.

14. The seal cartridge assembly of claim 13 wherein said bumper means is an annular bumper extending axially from each sidewall of the sealing ring.

* * * * *